United States Patent
Hartill et al.

[19]

[11] Patent Number: 6,070,357
[45] Date of Patent: Jun. 6, 2000

[54] TERMITE CONTROL SYSTEM

[76] Inventors: Debra L. Hartill; Stephen M. Nair, both of 6715 E. Clinton St., Scottsdale, Ariz. 85254

[21] Appl. No.: 09/175,110

[22] Filed: Oct. 19, 1998

[51] Int. Cl.[7] .................................................. A01M 1/20
[52] U.S. Cl. ........................................ 43/132.1; 43/124
[58] Field of Search ................................... 43/124, 132.1

[56] References Cited

U.S. PATENT DOCUMENTS

| | | | |
|---|---|---|---|
| 2,842,892 | 7/1958 | Aldridge et al. | 43/124 |
| 3,209,485 | 10/1965 | Griffin | 43/124 |
| 3,513,586 | 5/1970 | Meyer et al. | 43/124 |
| 3,602,248 | 8/1971 | Peacock | 137/357 |
| 4,625,474 | 12/1986 | Peacock | 52/101 |
| 4,742,641 | 5/1988 | Cretti | 43/132.1 |
| 4,800,672 | 1/1989 | Jackson | 43/125 |
| 5,007,197 | 4/1991 | Barbett | 43/124 |
| 5,317,831 | 6/1994 | Fletscher | 43/124 |
| 5,347,749 | 9/1994 | Chitwood | 43/124 |
| 5,353,544 | 10/1994 | Tsutsumi et al. | 42/125 |
| 5,378,086 | 1/1995 | Campbell, Jr. | 43/124 |

OTHER PUBLICATIONS

United States Department of Agriculture Home and Garden Bulletin 64.

*Primary Examiner*—Jack W. Lavinder
*Attorney, Agent, or Firm*—Warren F. B. Lindsley; Frank J. McGue

[57] ABSTRACT

A termiticide distribution system for treating an underlying area of a slab wherein a plurality of apertured distribution lines are arranged to offset a plurality of negative pressure and flow gradients of others of said distribution lines to uniformly enhance the coverage of the area treated.

5 Claims, 2 Drawing Sheets

TERMITE CONTROL SYSTEM

BACKGROUND OF THE INVENTION

Prior to 1988, chlordane was used for termite protection. Using chlordane, a single treatment of a building site prior to construction provided long-term protection against termites. The practice at that time entailed a single application to the soil prior to the pouring of foundations and cement slabs. Tests conducted as long as 52 years after such treatment indicated no signs of breakdown.

Unfortunately, because of environmental problems associated with chlordane, other chemicals have had to be substituted. The chemicals in use today for termite control are considerably more expensive. Furthermore, their effective life has not been reliably tested. Typically, the industry guarantees the life of such products applied as a pre-treat for only five years.

At the end of the five years, the homeowner must decide whether to gamble and risk a termite invasion or to apply a re-treatment. When possible, the re-treatment consists of drilling holes no more than every two feet around the perimeter of the home. The chemical is then injected, typically at the rate of four gallons per ten lineal feet. Frequently, the process becomes even more difficult and expensive. If the homeowner has planted trees of shurbs or has installed sidewalks of pools that interfer, ot becomes necessary to apply treatment from inside the structure, This intails, in many cases, pulling up carpets, drilling holes through ceramic tiles and cement slabs and the applying the chemicals through the holes. After all this, and at a cost more than twice that of the original pre-treat, the re-treatment is only guaranteed for one more year.

The present invention offers an effective alternative to the dilemma in the form of a termite control system that provides access to appropriate areas under the home for periodic or "as needed" chemical applications before and after construction.

DESCRIPTION OF THE PRIOR ART

Various types of termite control are described in the prior art.

The following patents apper to be of general interest but are not believed to anticipate the claimed invention.

| | |
|---|---|
| 2,842,892 | 4,625,474 |
| 3,209,485 | 4,742,641 |
| 3,513,586 | 5,007,197 |
| 3,602,248 | 5,353,544 |

United States department of Agriculture Home and Garden Bulletin 64

None of the above referinces disclose the claimed invention involving an apertured pipe dispersing means for applying and reapplying a termiticide uniformly over the area or about the perimeter of the area underlying the slab of an existing home or other structure.

SUMMARY OF THE INVENTION

In accordance with the invention claimed, a novel termite control system is provided for facilitating periodic treatments of a home or other structure after the original pre-treatment becomes ineffective or of questionable reliability.

It is, therefore, one object of the present invention to provide a termite control system for use in applying termite treatments uniformly to a home or other structure after the original pre-treatment has lost its effectiveness.

Another object of this invention is to provide such a termite control system in a form that permits ready access to the area that is to be treated without resorting to drilling or digging at the time of treatment.

A further object of this invention is to provide such a termite control system in a form that reduces the labor content or re-treatment expense to a very minimum.

A still further object of this invention is to provide such a termite control system at a low installation cost.

A still further object of this invention is to provide a layout pattern for such a termite control system which enables a substantially uniform distribution of the termiticide.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which.

DESCRIPTION OF THE PREFERRED EMBODIMENT

Figure 1:
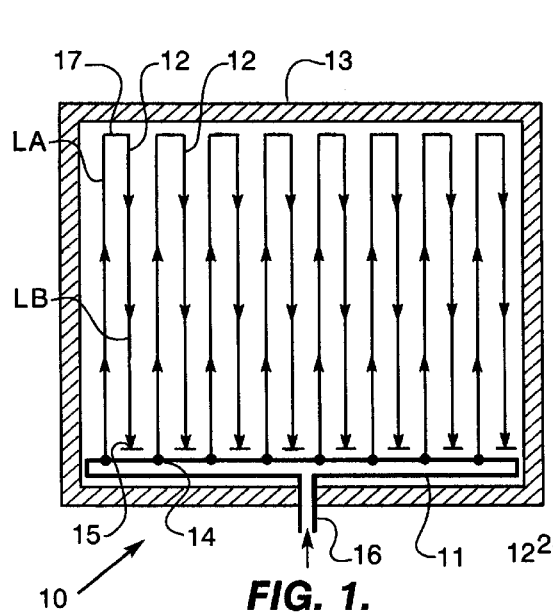
FIG. 1 is a plan view looking downward from above the slab and foundation of a house or other structure showing the layout of a typical version of the termite control system of the invention in which the termiticide is applied uniformly over the entire area underlying the slab and foundation of the structure.

Referring more particularly to the drawings by characters of reference, FIG. 1 illustrates a simplified first version of the termiticide distribution system of the invention. The distribution system 10 comprises a main conduit 11 supplying termiticide to a grid of perforated or apertured distribution tubes 12 which in this case are arranged to distribute the termiticide uniformly over the total area underlying the slab of a house or other structure as defined by the stem or foundation 13.

The main conduit 11 is typically made from plastic pipe with a diameter that is great enough to supply the termiticide at the required flow rate with an insignificant pressure drop from inlet to the most remote distribution tube connection.

The distribution tubes 12 are also made of plastic but in a considerably smaller cross-section in the interest of minimum total cost. One end of each tube 12 is connected to the main conduit 11 from which it receives termiticide; the other end is closed or capped. In FIG. 1, the conduit connection is identified by the numeral 14 and the capped end by the numeral 15. The distribution tubes are perforated on one or both sides along their total lengths at regular intervals such as one or two feet apart.

Termiticide applied under pressure to the main conduit 11 at an access point 16 flows through the main conduit 11 to the distribution tubes 12, enters the tubes 12 at connection points 14 and is ejected through the perforations (not shown in FIG. 1) into the surrounding sand or gravel underlying the slab of the structure.

Because of the small diameter or cross-section of the distribution tubes 12 the pressure drop from connection 14 to capped end 15 may be quite significant at the desired rate of termiticide distribution, and because the flow rate at each perforation is proportional to pressure, the flow rate for a given length of tube falls off accordingly from connection end 14 to capped end 15.

A key feature of the present invention is a novel arrangement of the distribution tubes 12 and the main conduit 11 to form a grid of distribution tubes that will provide a substantially uniform distribution of termiticide over the total area in spite of the pressure gradient of the individual tubes. In the version of FIG. 1, a single main conduit 11 extends along one wall of the stem 13 with connection points 14 spaced uniformly along its length. From each connection point 14, a distribution tube 12 extends perpendicularly to the opposite wall, turns 180 degrees and returns to a point just short of main conduit 11 where it is terminated and capped. It will be readily apparent that in this arrangement the highest pressure point of the tube 12 at connection point 14 lies adjacent the lowest pressure point at capped end 15. The reduced flow rate from perforations near the capped end will thus be offset by the higher flow rate from perforations near the connection point. Similar flow rate offsets occur between adjacent points of extended half LA and return half LB along their total lengths.

Figure 4:
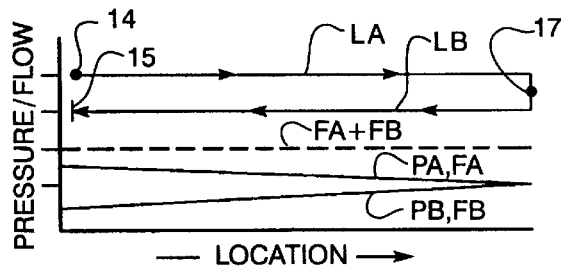
FIG. 4 is a diagrammatic illustration of the pressure and flow characteristics of the termite control system of FIG. 1.

The flow rate offsets just defined are illustrated in FIG. 4 where pressure and flow rate are shown as functions of position along distribution line segments LA and LB where PA, FA represents relative values of pressure and flow rate along segment LA and PB; FB represents pressure and flow rate along segment LB. It will be noted that PA, FA is maximum at conduit connection 14 and falls off progressively for successively greater distances downstream toward the halfway point 17 where tube 12 turns 180 degrees and return segment LB begins. In the same manner pressure and flow rates along segment LB which are shown as PB, FB are maximum at point 17 and fall off progressively for successively greater distances downstream from point 17 to a minimum value at capped end 15. If pressure and flow rate are assumed to fall off linearly with distance as shown. the sum of flow rates FA and FB is a constant value over the total lengths of segments LA and LB, and while the assumed linearity will not be realized in an actual implementation. a significant improvement in uniformity will nevertheless be realized as compared with a layout that does not incorporate the offsetting arrangement employed in the present invention.

Figure 2:
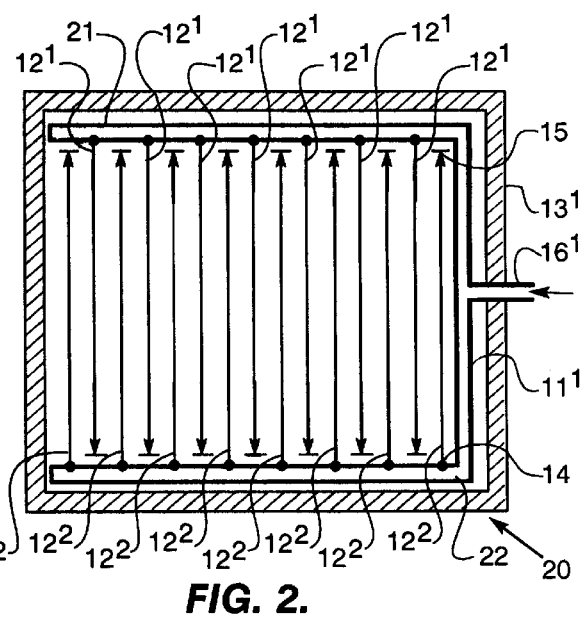
FIG. 2 illustrates a variation of the control system layout of FIG. 1.

In the termiticide distribution system 20 of FIG. 2. a second embodiment of the invention again incorporates a main conduit $11^1$ and an apertured or perforated grid of distribution tubes $12^1$ and $12^2$.

Conduit $11^1$ is U-shaped with the two arms 21 and 22 of the U extending along opposite walls of the stem $13^2$. Access to the main conduit $11^1$ may be at any point along the length of its U-shape such as at point $16^1$ as shown.

Distribution tubes $12^1$ are connected to arm 21 of U-shaped main conduit $11^1$ and extend perpendicularly toward arm 22 terminating just short of arm 22. while distribution tubes $12^2$ are connected to arm 22 and extend perpendicularly from arm 22 toward arm 21, terminating just short of arm 21. Tubes $12^1$ and $12^2$ are uniformly spaced along arms 21 and 22 with tubes $12^1$ and $12^2$ alternating so that each tube $12^1$ is juxtaposed with a tube $12^2$ with the connection end 14 of tube $12^1$ adjacent the capped end 15 of tube $12^2$ and with the connection end 14 of tube $12^2$ adjacent the capped end 15 of tube $12^1$.

Figure 5A:
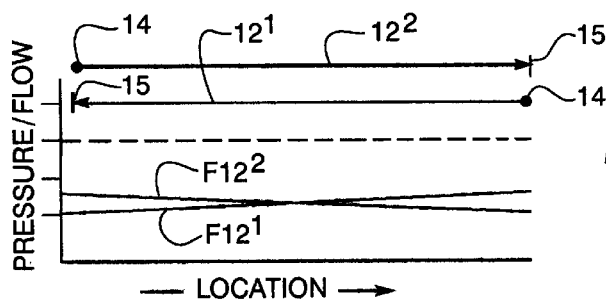
FIG. 5A is a diagrammatic illustration of the pressure and flow characteristics of the termite control systems of FIGS. 2 and 3.

As illustrated diagrammatically in FIG. 5A, the flow patterns for distribution tubes $12^1$ and $12^2$ again offset each other. with the higher flow from the connection end 14 of each distribution tube $12^1$ or $12^2$ offsetting the lower flow from the capped or terminating end 15 of an adjacent distribution tube $12^2$ or $12^1$. Again, if pressure and flow rates are assumed to fall off linearly with distance for the offsetting pairs of distribution tubes the combined flow pattern, $F12^1$ and $F12^2$ will again be constant as shown.

Figure 5B:
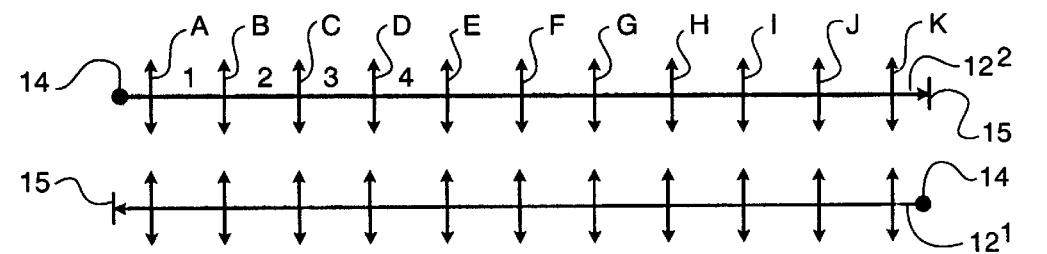
FIG. 5B is a further diagrammatic illustration of the pressure and flow conditions of the termite control system of FIGS. 2 and 3.
Figure 5B:
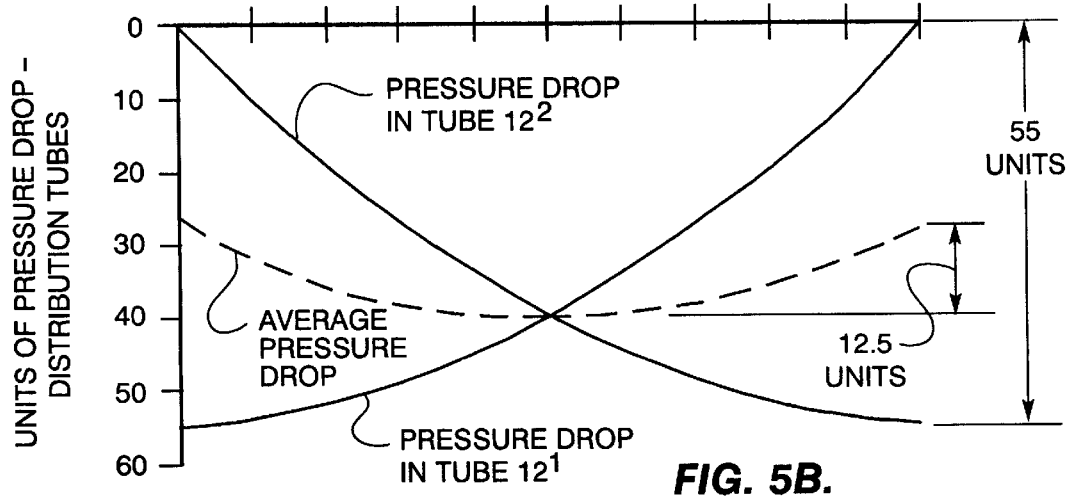

More realistically, the pressure variations along the lengths of the distribution tubes $12^1$ and $12^2$ will take the forms shown in the curves of FIG. 5B. At the top of FIG. 5B, a pair of adjacent tubes, $12^1$ and $12^2$, are shown with termiticide jets indicated at uniformly spaced intervals for tube $12^2$. Beginning at the connection end, successive spaced intervals or tube segments are denoted as 1,2,3,4 etc. and successive termiticide ejections are shown as jets A, B, C, D etc.

The pressure waveform shown in FIG. 5B for tube $12^2$ was obtained as follows:

1) Jet "A" is located very near to connection point 14 and is assumed to be ejected at main conduit pressure with no pressure drop indicated.

2) The pressure drop through tube segment 1 will be proportional to the total termiticide flow or flow rate through the segment 1. With termiticide entering at connection point 14 and flowing toward capped end 15, all of the termiticide ejected as jets "A" through "K" must first pass through segment 1. Assigning a value of one unit of flow for each jet, the total flow for the ten jets . "B" through "K" is ten units of flow, and assuming one unit of pressure drop for each unit of flow, a pressure drop for segment 1 of 10 units is obtained. Jet "B" is thus ejected at a pressure level that is ten units below main conduit pressure as indicated.

3) Segment 2 carries the termiticide ejected as jets "C" through "K", a total of nine jets. Accordingly, a pressure drop of nine units is obtained. Jet "C" is thus ejected at a pressure of nine units below the pressure at jet "B", or 19 units below main conduit pressure.

4) This process continues for the remaining segments of tube $12^2$ and is then repeated for tube $12^1$ beginning at the $12^1$ connection point 14 at the right side of the diagram.

Upon completion of the pressure calculations for tubes $12^1$ and $12^2$, the average values are obtained at corresponding jet locations and plotted as the broken line curve shown in FIG. 5B.

As indicated in FIG. 5B, the pressure drop for the individual tubes $12^1$ and $12^2$ ranges from zero at the connection point 14 to 55 units at capped end 15, while the average for the two adjacent tubes ranges from 27.5 to 40 units, a pressure variation of only 12.5 units. A 77 percent reduction in pressure variation is thus obtained over the length of the coupled distribution tubes.

Figure 3:
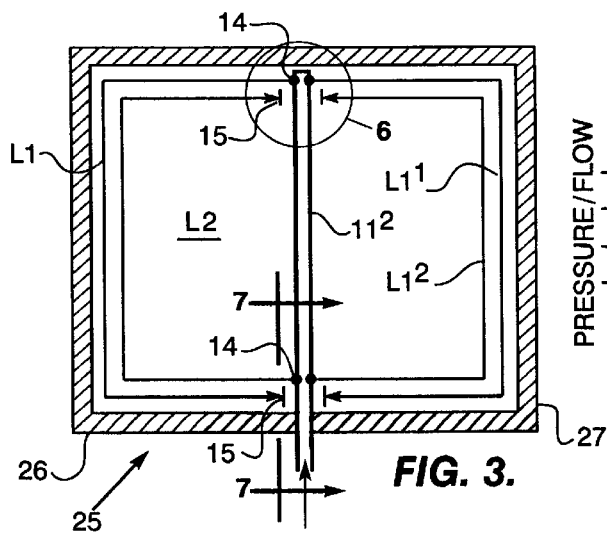
FIG. 3 is a plan view looking downward from above the slab and foundation of a house or other structure showing the layout of a typical version of the termite control system of the invention in which the termiticide is applied uniformly about the perimeter of the area underlying the slab and inboard of the stem or foundation.

FIG. 3 shows a termiticide distribution system 25 for treating the perimeter of a structure 26, again applying the principles of the invention to achieve a substantially uniform distribution about the enclosed area. In this case, a main conduit $11^2$ enters through the stem 27 at a point near the center of one wall and extends to the opposite wall, dividing the area enclosed by the stem 27 approximately in half. A first distribution tube L1, connected to the far end of the main conduit $11^2$ extends around the one half of the stem 27 and terminates at a point close to the near end of conduit $11^2$ while a second distribution tube L2, connected to the near end of conduit $11^2$ runs adjacent tube L1 to a point near the far end of conduit $11^2$. Again, with the connection ends 14 and the capped ends 15 of the two tubes juxtaposed, the flow patterns of the two tubes L1 and L2 offset each other to produce a substantially uniform distribution of termiticide about the perimeter traversed by tubes L1 and L2. The remaining half of the stem 27 is similarly treated by tubes L1 and L2

Figure 6:
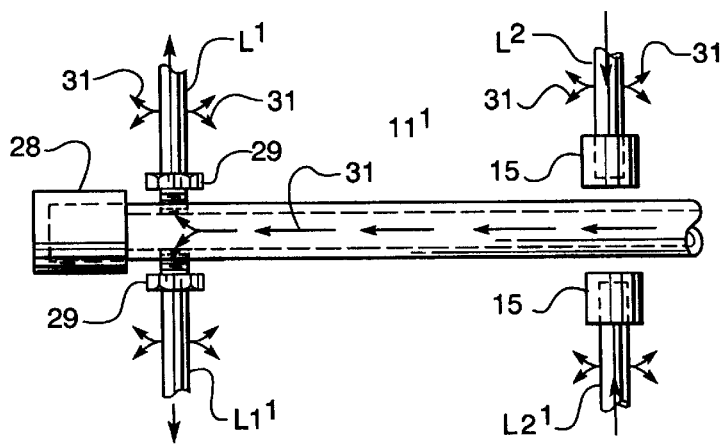
FIG. 6 is a partial view of the termiticide distribution hardware employed in the termite control systems of FIGS. 1, 2 and 3, and more particularly, showing an enlarged view of the hardware enclosed in circle 6 of FIG. 3.

The hardware employed in the implementation of the invention is illustrated in FIG. 6 which comprises an enlargement of the area 6 of FIG. 3. All of the parts shown in FIG. 6 are commercially available for general use. The main conduit $11^2$ may be a plastic or PVC pipe in any appropriate size such as ½ inch or ¾ inch while the distribution tubes L1, $L1^1$, L2 and $L2^1$ are more readily available in ABS plastic as employed in certain irrigation systems. Caps 15 for the distribution tubes and cap 28 for conduit $11^2$ are also commercially available in plastic, as are the adapters 29 employed for connection of the distribution tubes to the main conduit. The arrows 31 indicate termiticide flow through the main conduit $11^2$ into the distribution tubes L1, $L1^1$, L2 and $L2^1$ and discharge of the termiticide through apertures in walls of distribution tubes into the surrounding medium.

Figure 7:
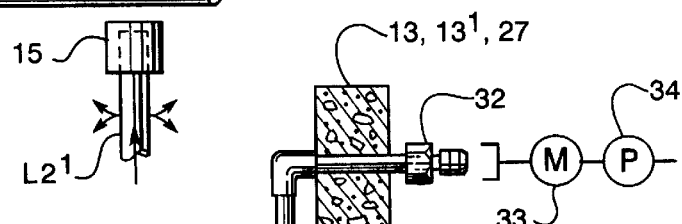
FIG. 7 is a cross-sectional view taken along line 7—7 of FIG. 3, showing typical hardware employed for access to the termite control system of the invention.
Figure 7:
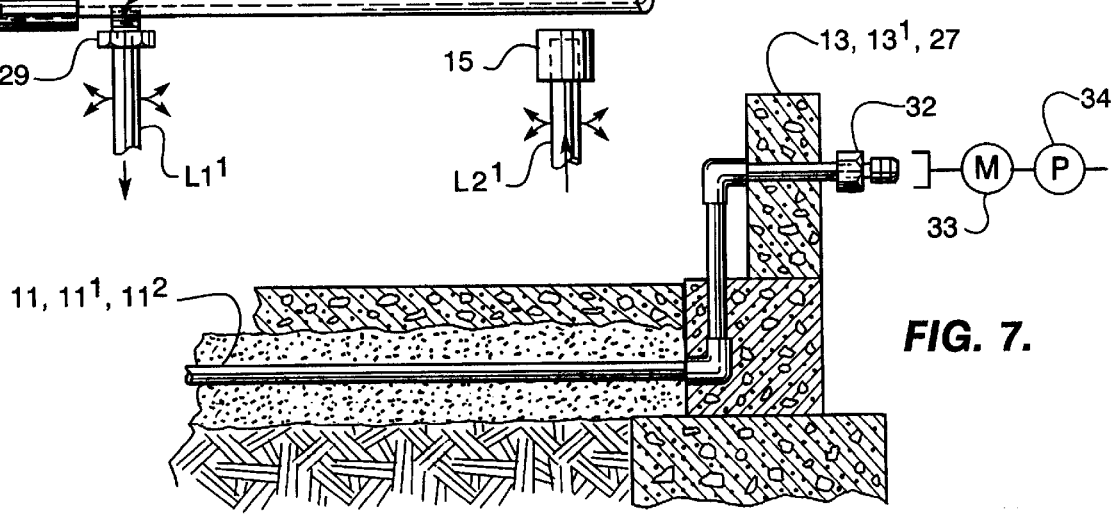

As shown in FIG. 7, the main conduit 11, $11^1$ or $11^2$ may be brought out from under the foundation or the slab making a pair of right angle turns to exit via the stem wall 13, $13^1$ or 27 at a convenient height. For convenience. a quick-disconnect means 32 is provided for connection a meter 33 and a pump 34 for use by service personnel during treatment operations in which a measured amount of termiticide is pumped into the termiticide distribution system.

Although but a few embodiments of the invention have been illustrated and described. it will be apparent to those skilled in the art that various changes and modifications may be made therein without departing from the spirit of the invention or from the scope of the appended claims.

What is claimed is:

1. A termiticide distribution system for treatment and re-treatment of an area underlying a slab of a home or other structure, the system comprising:

a main conduit;

a plurality of apertured distribution tubes connected to said main conduit;

an access means for providing access to said main conduit from outside said slab for supplying a given amount of termiticide to said system;

said main conduit having a cross-section large enough to handle the required flow of termiticide without a significant pressure drop; and said apertured distribution tubes being arranged to overcome the adverse effects of pressure drops in said distribution tubes by coupling pairs of said tubes for opposite directional termiticidical flow;

whereby a pressure drop of one of said coupled tubes is offset by a pressure drop of the other of said coupled tubes and the uniformity of the termiticide distribution over the treated area is enhanced.

2. The termiticide distribution system set forth in claim 1 in further combination with a rectangular stem: wherein the main conduit extends along one side of said stem;

each of said coupled pairs of apertured distribution tubes are connected to said main conduit at uniformly spaced positions along the length of said conduit;

a first distribution tube of each of said coupled pairs of distribution tubes extends perpendicularly from said main conduit to approximate the opposite wall of said stem;

upon reaching the proximity of said opposite wall, a second distribution tube of each of said coupled pairs of distribution tubes is connected in fluid communication with said first distribution tube, said second tube extends along said first tube returning to a terminating point near the connection of the first tube to said main conduit, said second tube being capped at the terminating point;

whereby said first and second tubes of each of said coupled pairs of distribution tubes carry termiticide in opposite directions such that the pressure inside said first tube is reduced as said opposite wall is approached, and the pressure inside said second tube is reduced as said main conduit is approached, such that directionally opposite pressure gradients are produced in the adjacent first and second tubes;

said first and second tubes dispensing termiticide via apertures uniformly spaced along the lengths of said first and second tubes, the flow rate at each aperture being proportional to pressure at that aperture; such that the combined flow rates of said first and second tubes are nearly constant over the length of said coupled pair of distribution tubes.

3. The termiticide distribution system set forth in claim 1, in further combination with a rectangular stem wherein a first arm of said main conduit extends along a first wall of said stem;

a second arm of said main conduit extends along a second wall of said stem, said second wall being opposite said first wall;

said plurality of apertured distribution tubes comprising a first set of uniformly spaced apertured distribution tubes connected along the length of said first arm of said main conduit;

a second set of uniformly spaced apertured distribution tubes connected along the length of said second arm of said main conduit;

said first set of distribution tubes extend perpendicularly form said first arm of said main conduit in the direction of said second arm of said main conduit and terminate at a point near said second arm of said main conduit;

said first and said second sets of uniformly spaced distribution tubes are interleaved so that one tube from the first set is adjacent one tube from the second set to form said coupled pairs of distribution tubes.

4. The termiticide distribution system set forth in claim 1 wherein:

said access to said main conduit comprises an extension of said main conduit passing through said stem and terminating outside said structure in a quick disconnect fixture suitable for attachment of service personnel's flow meter and termiticide pumping means.

5. A termiticide distribution system for treating the periphery of the stem of foundation of a home or other structure, the system comprising:

a main conduit;

two adjacent, oppositely flowing apertured distribution tubes connected to said main conduit and traversing the periphery of the stem that is to be treated; and an access means for providing access to said main conduit from outside said structure for supplying a given amount of termiticide to said system;

whereby said adjacent, oppositely flowing distribution tubes, enhance the uniformity of termiticide distribution about the periphery of said stem.

* * * * *